United States Patent
Mann et al.

(10) Patent No.: US 9,726,837 B2
(45) Date of Patent: Aug. 8, 2017

(54) LIGHT PIPE CONNECTOR APPARATUS

(71) Applicant: International Business Machines Corporation, Armonk, NY (US)

(72) Inventors: Phillip V. Mann, Rochester, MN (US); Kevin M. O'Connell, Rochester, MN (US); Arvind K. Sinha, Rochester, MN (US); Karl Stathakis, Rochester, MN (US); Kory W. Weckman, Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/919,779

(22) Filed: Oct. 22, 2015

(65) Prior Publication Data

US 2017/0090129 A1    Mar. 30, 2017

Related U.S. Application Data

(63) Continuation of application No. 14/863,716, filed on Sep. 24, 2015.

(51) Int. Cl.
| | |
|---|---|
| *G02B 6/12* | (2006.01) |
| *G02B 6/42* | (2006.01) |
| *G02B 6/43* | (2006.01) |
| *H04B 10/50* | (2013.01) |

(52) U.S. Cl.
CPC .......... *G02B 6/423* (2013.01); *G02B 6/428* (2013.01); *G02B 6/4214* (2013.01); *G02B 6/43* (2013.01); *H04B 10/501* (2013.01)

(58) Field of Classification Search
USPC ....................................... 385/14, 17
See application file for complete search history.

(56) References Cited

U.S. PATENT DOCUMENTS

| | | | |
|---|---|---|---|
| 6,416,334 | B1 | 7/2002 | Plishner |
| 6,550,982 | B2 | 4/2003 | Auburger et al. |
| 6,623,171 | B2 | 9/2003 | Heremans et al. |
| 7,344,383 | B1 | 3/2008 | Lu et al. |

(Continued)

OTHER PUBLICATIONS

Mann et al., "Light Pipe Connector Apparatus," U.S. Appl. No. 14/863,716, filed Sep. 24, 2015.

(Continued)

*Primary Examiner* — Eric Wong
(74) *Attorney, Agent, or Firm* — Nicholas D. Bowman

(57) ABSTRACT

Light can be transmitted between a light source and a light detector or target by using at least two mating connector sections of a light pipe connector. A protrusion of one of the connector sections is designed to be received within a receptacle of another of the connector sections, which can make the light pipe connector mechanically compliant. The two connector sections are fabricated from an optically transmissive material, and have optically reflective surfaces in orthogonal orientations to optically transmissive surfaces adjacent to the light source and the light detector. When the protrusion of one of the connector sections is engaged within the receptacle of another connector section, light can be transmitted through optically transmissive surfaces adjacent to a light source and a light detector, while the orthogonally oriented optically reflective surfaces direct light towards the light detector.

14 Claims, 5 Drawing Sheets

(56) References Cited

U.S. PATENT DOCUMENTS

| | | |
|---|---|---|
| 7,470,069 B1 | 12/2008 | Offrein et al. |
| 7,613,368 B2 | 11/2009 | Hougham et al. |
| 8,374,470 B2 | 2/2013 | Ban et al. |
| 8,708,576 B2 | 4/2014 | Shacklette et al. |
| 8,708,754 B2 | 4/2014 | Su et al. |
| 9,482,833 B1 * | 11/2016 | Mann .................. G02B 6/4292 |
| 2004/0047563 A1 * | 3/2004 | Kramer .................. G02B 6/43 385/47 |
| 2009/0269013 A1 | 10/2009 | Durand et al. |
| 2013/0301986 A1 | 11/2013 | Nakano et al. |

OTHER PUBLICATIONS

IBM, "List of IBM Patents or Patent Applications Treated as Related," 2 pgs., Oct. 19, 2015.

* cited by examiner

LIGHT PIPE CONNECTOR APPARATUS

BACKGROUND

The present disclosure generally relates to light pipe connector structures. In particular, this disclosure relates to mechanically compliant light pipe connectors designed to contain and guide light from a light source to a light detector.

Optical signals may be used as an alternative to electronic voltage signals for the transmission of digital information. Electronic signals from digital logic circuits, e.g., those using "high" and "low" voltages to represent logic levels, may be converted into discrete optical signals through the use of light-emitting diodes (LEDs) or solid-state lasers. Likewise, optical signals can be converted into electronic signals through the use of photodiodes or phototransistors, for introduction into the inputs of digital logic circuits.

Digital information in optical form, e.g., light pulses, may be transmitted through optically transmissive structures such as optical fibers and light pipes, which can be useful to guide the light pulses through the structure. In certain applications, an optical fiber can provide significantly higher data bandwidth capability than an electrical connection.

SUMMARY

Embodiments may be directed towards a light pipe connector. The light pipe connector may include a first surface of a first connector section, the first connector section being optically transmissive. The light pipe connector may also include a first optically reflective surface of the first connector section, the first optically reflective surface in an orthogonal orientation to the first surface. The light pipe connector may also include a protrusion of the first connector section, the protrusion having a second surface opposite to and in a planar orientation to the first surface, the protrusion further having a second optically reflective surface orthogonal to the second surface. The light pipe connector may also include a receptacle of a second connector section, the second connector section being optically transmissive, the receptacle of the second connector section adapted to receive the protrusion and having a third surface, when the protrusion is received within the receptacle, adjacent to and in a planar orientation to the second surface. The light pipe connector may also include a third optically reflective surface of the second connector section, the third optically reflective surface in an orthogonal orientation to the third surface. The light pipe connector may also include a fourth surface of the second connector section, in a planar orientation to and opposite to the third surface.

Embodiments may also be directed towards a method of operating a light pipe connector to transmit light between a light source and a light detector. The method may include optically coupling, to a light source, a first optically transmissive connector section of a light pipe connector and optically coupling, to a light detector, a second optically transmissive connector section of the light pipe connector. The method may also include engaging a protrusion of the first optically transmissive connector section with a receptacle of the second optically transmissive connector section and transmitting, using the light source, light through a first surface of the light pipe connector. The method may also include guiding, using reflective surfaces of the light pipe connector, the transmitted light from the first surface to a second surface of the light pipe connector and receiving, using a light detector, through the second surface of the light pipe connector, the transmitted light.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
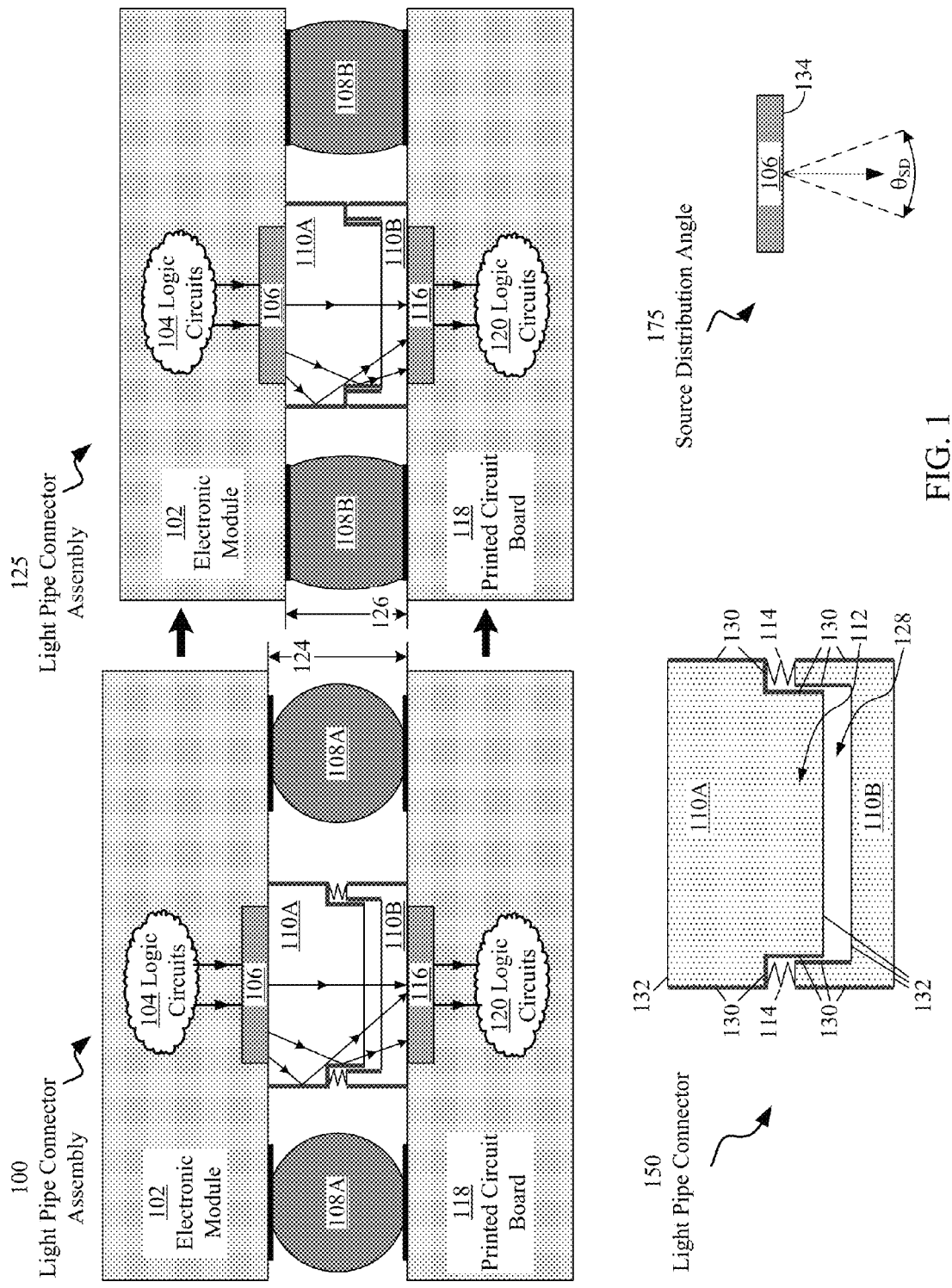
FIG. 1 includes two cross-sectional views of a light pipe connector assembly, a detailed cross-sectional view of a light pipe connector and a view depicting a light source distribution angle, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced containment and direction of optical signals through a light pipe connector used to optically connect an electronic module/device to an electronic packaging structure, e.g., a printed circuit board (PCB). Such electronic modules may include, but are not limited to, processor chips, graphics chips, hybrid digital-analog chips and application-specific integrated circuits (ASICs). Optical signals can be useful for enabling high-bandwidth, low-latency data transmission between components of electronic systems such as data processing, networking and telecom systems. While not necessarily limited thereto, embodiments discussed in this context can facilitate an understanding of various aspects of the disclosure. Certain embodiments may also be directed towards other equipment and associated applications, such as providing enhanced containment and direction of optical signals between electronic modules/devices such as processor, graphics and memory chips, which may be used within an electronic system such as a computer. Such electronic modules/devices may include both electrical and optical connecting structures arranged in a variety of configurations.

Embodiments may also be directed towards stacked light pipe connector structures, which, when assembled, may be useful to provide increased mechanical compliance between arrangements of components, while containing and directing optical signals through the arrangement. Such stacked light pipe connector structures may be useful in providing optical interconnect between a vertical stack of optoelectronic chips.

For ease of discussion, the term "ball-grid array" (BGA) is used herein in reference to electrical connector structures, however, it is understood that various embodiments can also be useful with regards to other types of electrical connector structures, e.g., land-grid arrays (LGAs), used to provide electrical connections to electronic modules. Embodiments may also be useful for other types of electrical interconnect structures that require mechanical compliance between interconnected components.

For ease of discussion, the terms "light source" and "light detector" are used herein, in the context of optoelectronic devices designed to convert electrical signals into optical signals, and optical signals into electrical signals, respectively. It is understood that in various embodiments, according to the ability of a light pipe connector structure to allow the transmission of light in two opposite directions, that the light source and light detector locations and usage may be interchanged with respect to locations depicted in the figures herein. It may be understood that a "target" for transmitted light can include a light detector, or an end of an optically transmissive structure such as a light pipe or optical cable.

For purposes of this discussion, the term "light" refers to the portion of the electromagnetic spectrum that may be generally useful for optical data communications. It may be understood that this portion of the electromagnetic spectrum may extend beyond the range of light generally understood to be visible by the human eye, approximately 390 nm to 780 nm. Optical data transmission wavelengths may be in the infrared portion of the electro-magnetic spectrum.

Optical data transmission wavelengths may be chosen based on properties, e.g., scattering and reflection, of a certain optical media at certain wavelengths, or wavelength ranges. For example, wavelengths that may be useful for fiber optics may include, but are not limited to, 650 nm, 850 nm, 1,300 nm, and 1,550 nm; these correspond to points or ranges in the electromagnetic spectrum that have minimal scattering and attenuation within the optical fiber. The properties of an optically conductive material may be chosen to be suitable for use with wavelengths of light generally useful for optical data communications. Wavelengths and associated optical materials may also be chosen based on frequency characteristics of commercially available optical data transmitters, such as lasers, and receivers such as photodiodes.

An optical signal channel may provide higher bandwidth signals than an electrical channel, depending on the properties of each interface, such as loss, reflection and noise immunity. For example, an electrically conductive channel for a certain application may have a bandwidth density of 28.5 gigabits per second per millimeter (Gbps/mm), while an optically conductive channel may have a bandwidth density of 160 Gbps/mm. High bandwidth density interconnect may be desirable in high-performance computing and other electronic applications, and may be enabled through the use of optical interconnect structures within a single PCB layer.

Advances in semiconductor chip technologies have resulted in increases in the operating frequencies and computational capabilities of processor chips. In order for the capabilities of such advanced processor chips to be fully exploited in an electronic system such as a computer, low-latency, high bandwidth input/output (I/O) channels to and from the chips may be necessary. Processor development trends suggest that future processor chips will contain a mixture of optical and electronic signals as part of the I/O channels. While high-bandwidth optical signals are currently possible in permanently attached processor modules, there remains a need for a replaceable processor module having both electrical and optical connections which support high-quality, high-bandwidth signals.

An optoelectronic device such as a processor chip or module may be optically coupled to an optically transmissive PCB or cable through the use of a compliant window with a lens molded into a processor socket housing. The lens can be used to collect an optical signal generated by the optoelectronic device and refocus it into a light detector or light pipe within an electronic packaging structure such as a PCB, optical cable or another optoelectronic module.

The compliant window and/or lens may be compressed during the mounting or assembly of an optoelectronic device/module to a PCB or to another module. During compression, compliant material may expand laterally, which may require additional clearance around each compliant window/lens, which may, in turn, limit the overall placement density of adjacent optical transmission paths on the surface of an electronic chip and/or module. The amount of lateral expansion of the compliant material may be proportional to the amount of compliance required when mounting or assembling an optoelectronic device/module to a socket or PCB. In certain applications, the size of compliant windows and/or lenses may limit the number of optical channels possible on a chip/processor by requiring them to be in the center of the compliant material and/or clustered, to minimize a mechanical and/or optical tolerance(s). Such limitations of optical interconnect placement density may not be compatible with the placement density of current electrical interconnect structures such as BGAs and LGAs.

In some applications, an optoelectronic device can be optically coupled to an optically transmissive PCB or cable through close placement of light sources, e.g., on a processor module, and light detectors, e.g., on a PCB. Such placement may result in an optical signal being transmitted through an air gap between the light source and light detector. Such transmission may result, due to a source distribution angle of the light source, in dispersion of light from one light source to light detectors adjacent to an intended "target" light detector. Such light dispersion may result in decreased signal strength at the target light detector, as well as transmission of an optical signal to an unintended light detector. This transmission may result in a form of optical "crosstalk", which may be detrimental to optical signal quality and bandwidth.

Embodiments of the present disclosure generally relate to a mechanically compliant optical connector assembly configured to provide a controlled optical path between a light source and a light detector over an expansion/contraction range of the connector assembly. The optical connector assembly may therefore be useful to control or eliminate air gaps in the optical path, which may control or eliminate light dispersion and increase light received at the light detector/target. Direct physical contact between a light source and the optical connector assembly and between the light detector or target and the optical connector assembly may result from the use of the optical connector assembly in an electronic system. According to embodiments, an electronic assembly including an optical connector assembly may be easily assembled and disassembled.

In embodiments, reflective surfaces of the optical connector assembly, in conjunction with a protrusion of one light pipe connector section mated with a corresponding recess of another light pipe connector section may be useful to reflect light away from outer surfaces of the optical connector, towards an intended target or light detector. Such light reflection may be useful in managing or eliminating light dispersion from the connector and increasing the proportion of transmitted light that is received at the light detector. Increased transmission efficiency and integrity may result from the use of a mechanically compliant optical connector assembly.

The optical connector assembly may be useful for providing optical interconnections having high density, bandwidth and quality, between an electronic module such as a processor chip and electronic packaging structures such as a PCB, or between two or more electronic modules. According to embodiments, optical "crosstalk" between adjacent optically transmitted signals may be managed through the use of an optical connector assembly. According to embodiments, the placement of mechanically compliant optical connector assemblies may not be constrained by lateral expansion, and thus optical connector assemblies may be placed adjacent to each other in a variety of high-density arrangements such as arrays.

An optical connector assembly designed according to certain embodiments may be compatible with existing and proven optoelectronic components, and may be a useful and cost-effective way to provide high-density, high-bandwidth and low-latency optical interconnect paths between components in an electronic system. An optical connector assembly constructed according to embodiments of the present disclosure may be installed in an existing electronic system.

Embodiments of the present disclosure can be useful by using aspects of known fabrication processes to create a mechanically compliant optical connector assembly, which may facilitate low cost, high-performance, reliable interconnect solutions not requiring substantial development time, effort or expense to implement.

According to embodiments, a mechanically compliant optical connector assembly can provide high-density, high-performance optical interconnection between a light source and a light detector incorporated in optoelectronic components of an electronic system such as a computer. The optical connector assembly can guide light from the light source to the light detector while minimizing light dispersion and optical "crosstalk" between adjacent light detectors, and maximizing the amount of transmitted light received at the light detector. The mechanical compliance of the optical connector assembly can be useful in maintaining the high-quality optical connection over a range of distances between a light source and the light detector. Such distances may result from optoelectronic component assembly tolerances and assembly processes such as BGA reflow.

For simplicity of illustration, certain figures show only a single light pipe connector structure; however, embodiments may include a plurality of light pipe connector structures, which may be arranged in various configurations such as arrays. Embodiments can also include a plurality of electronic modules and/or electronic packaging structures such as PCBs. While all figures illustrate the principles and features of the present disclosure, they are not necessarily drawn to scale.

Certain embodiments relate to mechanically compliant, high-density, high-quality light pipe connector assemblies designed to guide and focus light from a light source to a light detector. FIG. 1 includes four consistent views directed towards a light pipe connector. Cross-sectional views 100 and 125 depict a light pipe connector assembly, including electronic module 102 and PCB 118 optically connected by light pipe connector sections 110A, 110B, according to embodiments of the present disclosure. Electronic module 102 and PCB 118 are arranged in a substantially planar stacked arrangement and are electrically and physically interconnected by electrical connecting structures (BGAs) 108A and 108B, in views 100, 125, respectively. According to embodiments, electronic module 102 can be a semiconductor chip, a hybrid module on a substrate, or any sort of electronic module including a light source 106. The mated arrangement of light pipe connector sections 110A and 110B can be useful for guiding and focusing optical data signals from light source 106 of electronic module 102 to light detector 116 of PCB 118. FIG. 1 also includes a detailed cross-sectional view 150 of a light pipe connector and view 175 depicting a source distribution angle of light source 106.

Some embodiments may be particularly useful for transmission of data, particularly high speed serial data, through light pipe connector 150. Examples of serial data protocols may include, but are not limited to, Universal Serial Bus (USB), Peripheral Component Interconnect (PCI) Express, FireWire, Ethernet and HyperTransport.

According to embodiments, a light source 106 may include devices such as light-emitting diodes (LEDs), vertical-cavity surface-emitting lasers (VCSELs) and other types of solid-state lasers. In some embodiments, light source 106 may be integrated into electronic module 102 and controlled and/or modulated by logic circuits 104 of electronic module 102, which may be useful for changing the representation of digital data from electronic signals to optical signals.

According to embodiments, light pipe connector sections 110A, 110B may be constructed from any optically transparent/transmissive materials including, but not limited to Lexan™, fused silica, clear polycarbonates, optically transparent polymers and optical grade acrylics. The dimensions and optical properties of the optically transparent material may be chosen to create an optical channel suitable for the transmission of particular wavelength(s) of light. In embodiments, reflective surfaces 130 as depicted in view 150, may be fabricated from optically reflective materials including, but not limited to a foil layer, chromium, aluminum, copper, other type of reflective metal layers, and white paint. Reflective surfaces 130 may be formed on or attached to light pipe connector sections 110A, 110B through processes such as sputtering, electroplating, anodizing and through the use of adhesive coatings. The optically transmissive properties of light pipe connector section materials, in conjunction with the properties of optically reflective materials may be useful for guiding and directing light through a light pipe connector structure.

Potential fabrication techniques used to apply optically reflective surface(s) 130 to the light pipe connector 150 may need to be tested before production use, to ensure that the optical transmission capability of the light pipe connector material is not adversely affected during the optically reflective layer attachment/application process. According to embodiments, various optically reflective layer designs and assembly techniques may be chosen for a particular application, depending on a certain light pipe connector dimensions, shape, profile and material type.

According to embodiments, light detectors 116 may include devices such as photoconductor, junction photodetectors such as Schottky diodes, p-type/intrinsic/n-type (PIN) diodes and metal-semiconductor-metal (MSM) diodes, avalanche photodiodes and other types of solid-state light detectors. In some embodiments, light detectors 116 may be integrated into printed circuit board 118 and can provide electrical signals to logic circuits 120, in response to light received from light source 106. Light detectors 116 may be useful for converting data represented by optical signals into data represented by electronic signals. In some embodiments, light detectors 116 may be integrated into electronic modules, e.g., 102, in order to provide electrical signals to logic circuits in response to light received from a light source, e.g., 106.

Light sources and detectors such as depicted by 106 and 116 may be discrete electronic devices, having a singular function of transmitting or receiving an optical signal, or may be integrated into another electronic device such as an integrated circuit.

View 150 is a detailed cross-sectional view, consistent with the views, of an optically transparent light pipe connector formed by engaged light pipe connector sections 110A and 110B. Although light pipe connector sections 110A and 110B are optically transparent, view 150 depicts them as shaded, in order to highlight receptacle 128 and protrusion 112.

According to embodiments, light pipe connector sections 110A and 110B may be manufactured with dimensions that allow the protrusion 112 of light pipe connector section 110A to be easily inserted within the receptacle 128 of light pipe connector section 110B. Insertion or engagement of the protrusion 112 within the receptacle 128 may be useful for containing, guiding and focusing light through the light pipe connector 150 over a range of protrusion 112/receptacle 128 engagement depths. A continuity of reflective surfaces 130, generally parallel to the direction of transmitted light, can promote containment of light within the light pipe connector 150. The containment and focus of transmitted light can prevent light dispersion onto adjacent light detectors, which may prevent signal crosstalk resulting from light bleeding out from the light pipe connector 150. Light pipe connector 150 may be useful in providing small, high-density connections that are dimensionally compatible with existing PCB connector structures such as vias and surface-mount pads.

According to embodiments, light pipe connector sections 110A and 110B are manufactured from optically transmissive materials, and it may be understood that, with the exception of optically reflective surfaces 130, the surfaces 132 depicted are optically transmissive. According to embodiments, optically transmissive surfaces 132 will generally be oriented in a perpendicular orientation to light emitted from light source 106, view 100, and optically reflective surfaces 130 will generally be oriented in an orthogonal orientation to optically transmissive surfaces 132. The relative orientations of the optically transmissive and reflective surfaces promote transmission of light to the target/light detector 116 and prevent light from being dispersed through the exterior reflective surfaces 130 of the light pipe connector 150.

Compliant material 114 can be a spring made from spring steel, various types of rubber or rubber-like material, or foam. In embodiments, compliant material 114 can be useful to provide a force on light pipe connector sections 110A, 110B to keep them adjacent to the electronic module 102 and PCB 118, respectively, as depicted in views 100, 125, during assembly and operation of the light pipe connector.

View 175 depicts a source distribution angle ($\theta_{SD}$) of the light source 106. A light source 106 such as an LED or a VCSEL may emit light within an angular range of a direction perpendicular to an emitting surface 134. In certain applications, a $\theta_{SD}$ of a particular light source 106 may be 5° or +/−2.5° from the normal of the light source emitting surface 134. A source distribution angle $\theta_{SD}$ of a particular type of light source 106 may vary from 5°, depending on the technology used by a light source 106 to generate light.

In embodiments, the two mated light pipe connector sections 110A, 110B include a continuity of reflective surfaces 130 oriented parallel to the general direction of light traveling through the connector sections 110A, 110B. Reflective surfaces 130 are useful to compensate for the effects of a source distribution angle $\theta_{SD}$ by containing and reflecting light within light pipe connector sections 110A, 110B towards a target or light detector 116.

In some embodiments, according to the ability of light pipe connector 150 to propagate light in two directions, light can be transmitted by a light source, e.g., 106, through a light pipe connector section 110A and a light pipe connector section 110B to a light detector 116, and in some embodiments not shown in FIG. 1, light can be transmitted by a light source, through a light pipe connector section 110B and a light pipe connector section 110A to a light detector.

According to embodiments, view 100 depicts an "uncompressed" light pipe connector assembly, where electronic module 102 and printed circuit board 118 are located a distance 124 apart by electrical connector structures 108A, e.g., BGAs prior to a solder reflow process. Similarly, view 125 depicts a "compressed" light pipe connector assembly, where electronic module 102 and PCB 118 are located a distance 126 apart by electrical connector structures 108B. Following a solder reflow process, connector structures 108B are soldered to both electronic module 102 and to printed circuit board 118. The difference between distance 124 and distance 126 is due to the collapse of the electrical connector structure, e.g., BGA, during the reflow process. Other types of electrical/mechanical connecting structures such as compliant pins and compressible "buttons", which may be used in LGA socket applications, may similarly result in a difference between "uncompressed" distance 124 and "compressed" or assembled distance 126.

According to embodiments, the assembly of the protrusion 112 of the light pipe connector section 110A within the receptacle 128 of the light pipe connector section 110B can provide overlapping reflective surfaces 130. According to embodiments, overlapping reflective surfaces 130, including reflective surfaces on protrusion 112, can be useful for guiding and directing light from light source 106 to light detector 116 over a range of distances between electronic module 102 and PCB 118. The use of a mechanically compliant light pipe connector 150 can provide for small, controlled air gaps between an optically transmissive surface of the protrusion 112 and an optically transmissive surface of the receptacle 128. Such controlled air gaps, in conjunction with surrounding reflective surfaces 130 can be useful in enhancing light transmission from a light source 106 to a light detector 116 and minimizing the amount of light dispersed away from a target/light detector 116.

The range of distances that is realizable between, for example, electronic module 102 and PCB 118, can be useful in allowing a light pipe connector to be mechanically compliant between optically connected components. This range of distances may result from an assembly process, mechanical tolerances of electrical/mechanical interconnect structures, and other factors. In some embodiments, the range of distances between optically coupled elements such as electronic module 102 and PCB 118 may vary over time, for example, during a manufacturing or assembly process, or during long-term use.

In general, Table 1-Table 4 detail results from optical design software simulations designed to compare the simulated percent of light flux output of various light pipe connector configurations. Light pipe connector configurations can include a variety of connector material types, connector reflective surface treatments, source distribution angles and number of connector sections/surfaces. Sets of optical simulations may be run and the results tabulated to show differences in percent of light flux output resulting from various light pipe connector configurations.

The numbers presented in Table 1-Table 4 generally represent the proportion, as a percentage, of light entering one or more light pipe connectors that is transmitted through the connector(s) and emerges from an optically transmissive surface of the final connector. For example, a table entry of 73.0 for a particular light pipe connector configuration indicates that 73.0% of the light that enters an optically transmissive surface of the light pipe connector(s) may emerge from an opposite optically transmissive surface. It may be understood that simulation results are subject to optical modeling error tolerances and accuracy of optical modeling simulation software. In some cases, for example, simulation results may vary from the actual amount of light transmitted through the light pipe connector by as much as 10%.

Optical design software simulation results can be useful for estimating and/or predicting the optical performance and feasibility of a variety of optical connector configurations before fabricating such configurations. In general, the simulation data presented in the tables herein appears to indicate that, over a variety of light pipe connector configuration types, a relatively high percentage of the light that enters one or more light pipe connector sections configured according to embodiments, is transmitted through the light pipe connector sections.

Table 1 includes percent light flux simulation results for a 2-section light pipe connector structure consistent with views 100, 125 and 150, for four material types and four source distribution angles. The results included in Table 1 indicate that a high percentage, between 81.5% and 100.0%, of the light entering the first light pipe connector is transmitted through the additional mated light pipe connector section.

TABLE 1

Percent Flux at Light Pipe Connector Outlet (2 Sections)

| Material Type | Source Distribution Angle | | | |
|---|---|---|---|---|
| | 0 Degrees | 5 Degrees | 10 Degrees | 20 Degrees |
| Lexan ™ | 89.9 | 89.8 | 88.6 | 81.5 |
| Lexan ™ w/ white paint | 89.9 | 90.4 | 92.9 | 103.1 |
| Fused Silica | 93.4 | 93.4 | 92.4 | 85.0 |
| Fused Silica w/ white paint | 93.4 | 93.4 | 95.6 | 100.0 |

Table 2 includes percent light flux simulation results for a 4-section light pipe connector structure, over four material types and four source distribution angles. The results included in Table 1 indicate that a relatively high percentage, between 64.5% and 85.7%, of the light entering the first light pipe connector section is transmitted through the additional three mated light pipe connector sections.

TABLE 2

Percent Flux at Light Pipe Connector Outlet (4 Sections)

| Material Type | Source Distribution Angle | | | |
|---|---|---|---|---|
| | 0 Degrees | 5 Degrees | 10 Degrees | 20 Degrees |
| Lexan ™ | 73.0 | 72.9 | 71.7 | 64.5 |
| Lexan ™ w/ white paint | 73.0 | 73.8 | 75.7 | 79.7 |
| Fused Silica | 81.6 | 81.5 | 80.3 | 72.6 |
| Fused Silica w/ white paint | 81.6 | 82.2 | 83.6 | 85.7 |

Table 3 includes percent light flux simulation results for a 6-section light pipe connector structure, over four material types and four source distribution angles. The results included in Table 1 indicate that a relatively high percentage, between 51.9% and 72.3%, of the light entering the first light pipe connector section is transmitted through the additional five mated light pipe connector sections.

TABLE 3

Percent Flux at Light Pipe Connector Outlet (6 Sections)

| Material Type | Source Distribution Angle | | | |
|---|---|---|---|---|
| | 0 Degrees | 5 Degrees | 10 Degrees | 20 Degrees |
| Lexan ™ | 59.3 | 59.2 | 58.2 | 51.9 |
| Lexan ™ w/ white paint | 59.3 | 59.8 | 60.9 | 62.0 |
| Fused Silica | 71.2 | 71.2 | 70.2 | 62.9 |
| Fused Silica w/ white paint | 71.2 | 71.6 | 72.3 | 71.9 |

Table 4 includes percent light flux simulation results for light pipe connector structures having between one and twelve surfaces, over a range of two material types and having a light source distribution angle of 0°. The results included in Table 4 indicate that at a source distribution angle of 0°, light pipe connector structures fabricated from Lexan™ and fused silica transmit a relatively high percentage, between 59.3% and 100.0%, of the light entering the first light pipe connector section, through the additional mated light pipe connector sections.

TABLE 4

0-Degree Flux Percentage

| # Surfaces | Lexan ™ | | | Fused Silica | | |
|---|---|---|---|---|---|---|
| | 6 Sections | 4 Sections | 2 Sections | 6 Sections | 4 Sections | 2 Sections |
| 1 | 100.0 | 100.0 | 100.0 | 100.0 | 100.0 | 100.0 |
| 2 | 99.9 | 99.9 | 99.9 | 100.0 | 100.0 | 100.0 |
| 3 | 94.9 | 94.9 | 94.8 | 96.7 | 96.7 | 96.7 |
| 4 | 90.0 | 90.0 | 89.7 | 93.4 | 93.4 | 93.4 |
| 5 | 85.5 | 85.4 | — | 90.3 | 90.3 | — |
| 6 | 81.1 | 81.0 | — | 87.3 | 87.3 | — |
| 7 | 77.0 | 76.9 | — | 84.4 | 84.4 | — |
| 8 | 73.0 | 73.0 | — | 81.6 | 81.6 | — |
| 9 | 69.3 | — | — | 78.9 | — | — |
| 10 | 65.8 | — | — | 76.2 | — | — |
| 11 | 62.5 | — | — | 73.7 | — | — |
| 12 | 59.3 | — | — | 71.2 | — | — |

According to embodiments, a designer may specify light pipe connector structure material dimensions and optical properties as needed to create light pipe connector structures that can be integrated with existing electrical connector structures such as BGAs and LGAs.

Figure 2:
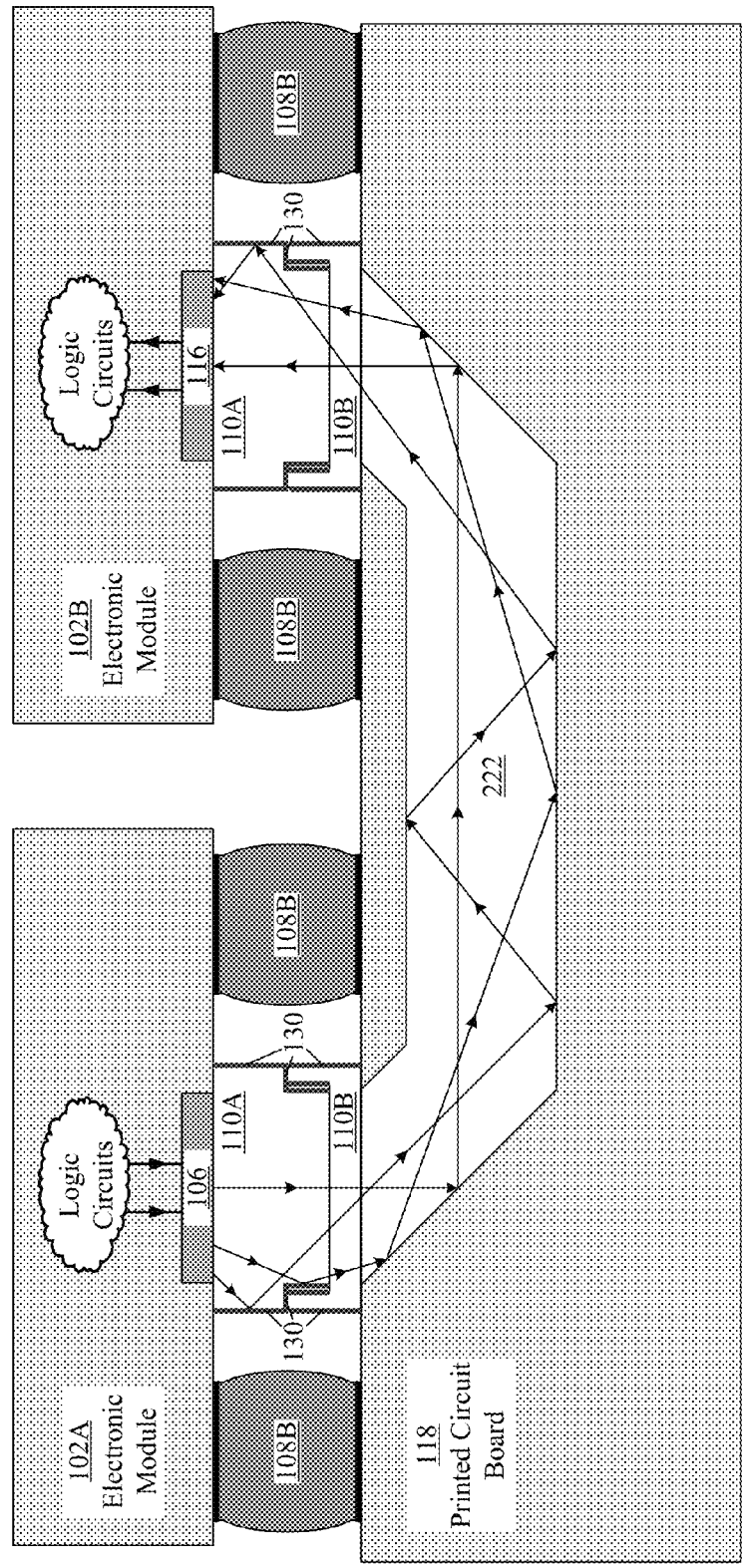
FIG. 2 depicts a cross-sectional view of a light pipe connector assembly, including electronic modules attached to a printed circuit board, according to embodiments consistent with the figures.

FIG. 2 depicts a cross-sectional view of a light pipe connector assembly 200, including electronic modules 102A and 102B attached with BGAs 108B to printed circuit board 118, according to embodiments consistent with the figures. Light pipe connector assembly 200 may be useful for providing an optical channel, including light pipe connector sections 110A and 110B attached to electronic modules 102A and 102B and light pipe 222, between light source 106 and light detector 116. Such an optical channel may be useful for providing high bandwidth optical connections between electronic components such as electronic modules 102A and 102B. In some embodiments in which electronic modules such as 102A and 102B are electrically connected to a PCB 118 through the use of LGA connector structures, the light pipe connector formed by 110A and 110B may be removable from the light pipe connector assembly 200. A removable light pipe connector may have certain advantages in allowing an electronic module such as a processor chip to be easily replaced, for example, in field upgrade applications. For simplicity of illustration only one light pipe 222 is shown, however, more are possible in accordance with known manufacturing practices for PCBs.

According to embodiments, transmission of optical signals across an optical channel including light pipe 222 can include transmitting light from a light source 106 through a surface of the light pipe connector adjacent to, or in contact with, the light source 106. In some embodiments, an optical channel can include an optically transmissive cable such as a fiber-optic cable. Light transmission can include reflection off of interior surfaces of a light pipe connector, light pipe or optically transmissive cable to direct the light to a target, e.g., light detector 116.

According to embodiments, an optically conductive layer in the PCB may be formed into a light pipe, e.g., 222, which may be used to transmit and direct optical signals from a first location of the PCB to a second location on the PCB, for example, between light source 106 and a light detector 116. In certain embodiments, an optical signal may include high-speed serial (HSS) data, for example, at data rates of 40 gigabits per second (Gbps). Other types of data, at other data rates, may be transmitted across an optical signal transmission path.

The optically conductive light pipe 222 may be constructed from materials such as acrylics, polycarbonate, and a variety of other optically transparent polymers. The dimensions and optical properties of the optical material may be chosen to create an optical channel suitable to particular wavelength(s) of light transmitted across the optical channel. The optical characteristics of light pipe 222, for example, optical attenuation and scattering, may be determined by the type of material used for, and the wavelength(s) of light transmitted through light pipe 222. A designer may choose and specify certain optical material(s) for light pipe 222 based on optical, physical or other properties, such as mechanical stability, ease of depositing or shaping during a manufacturing process, to be suitable for a certain application.

The light pipe connector assembly 200 may be compatible with existing PCB material sets and fabrication technologies, and may be useful in enabling compact, cost-effective, high bandwidth optical and electrical connections, through a PCB, to connectors, components and other PCBs mounted on a surface of the PCB 118. Light pipe connector assembly 200 may also be useful in providing small, high-density connections that are compatible with existing PCB connector structures such as vias and surface-mount pads.

In some embodiments, optical signals may be transmitted through an optical channel including light pipe 222 in two directions. For example, a light source and light detector may both be aligned at a particular end of the light pipe 222, and a corresponding light detector and light source may also be aligned at an opposite end of the light pipe 222.

Figure 3:
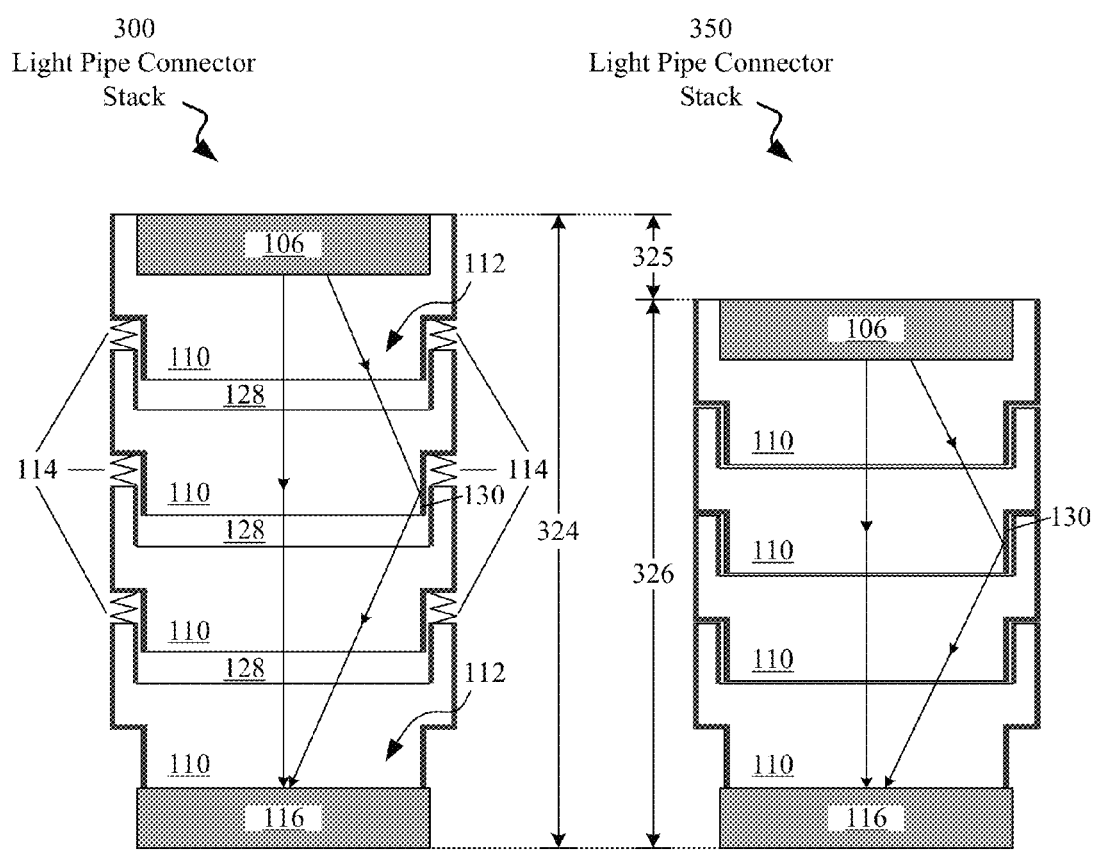
FIG. 3 includes two cross-sectional views of a light pipe connector stack, according to embodiments consistent with the figures.

FIG. 3 includes two cross-sectional views 300 and 350 of a light pipe connector stack including light pipe connectors 110 and compliant material 114, according to embodiments consistent with the figures. In embodiments, stacking of more than two light pipe connectors 110 may offer greater mechanical compliance than may be possible by interconnecting two light pipe connectors 110. For example the height difference 325 between "uncompressed" height 324 and "compressed" height 326 may be greater than a corresponding height difference achievable using two light pipe connectors 110. This height difference 325 may be useful in compensating for distance changes between optically interconnected electronic modules, particularly modules in a stacked arrangement separated by a distance greater than the height of one electrical connector structure (BGA) 108. Although four light pipe connectors 110 are depicted in FIG. 3, a greater or lesser number of pipe connectors 110 may be arranged in a stacked configuration, according to embodiments.

According to embodiments, compliant material 114 can be a spring made from spring steel, various types of rubber or rubber-like material, compressible foam or any other suitable material. In embodiments, compliant material 114 can be useful to provide forces to separate the light pipe connectors 110 and keep them positioned adjacent to a light source 106, a light detector 116 and/or a light pipe during assembly and operation of the light pipe connector.

Consistent with view 150, FIG. 1, protrusions 112 engaged in recesses 128, in conjunction with optically reflective surfaces 130 can create an overlapping arrangement of optically reflective surfaces 130 that is useful for directing light, for example, from a light source 106, towards a light detector 116.

Figure 4:
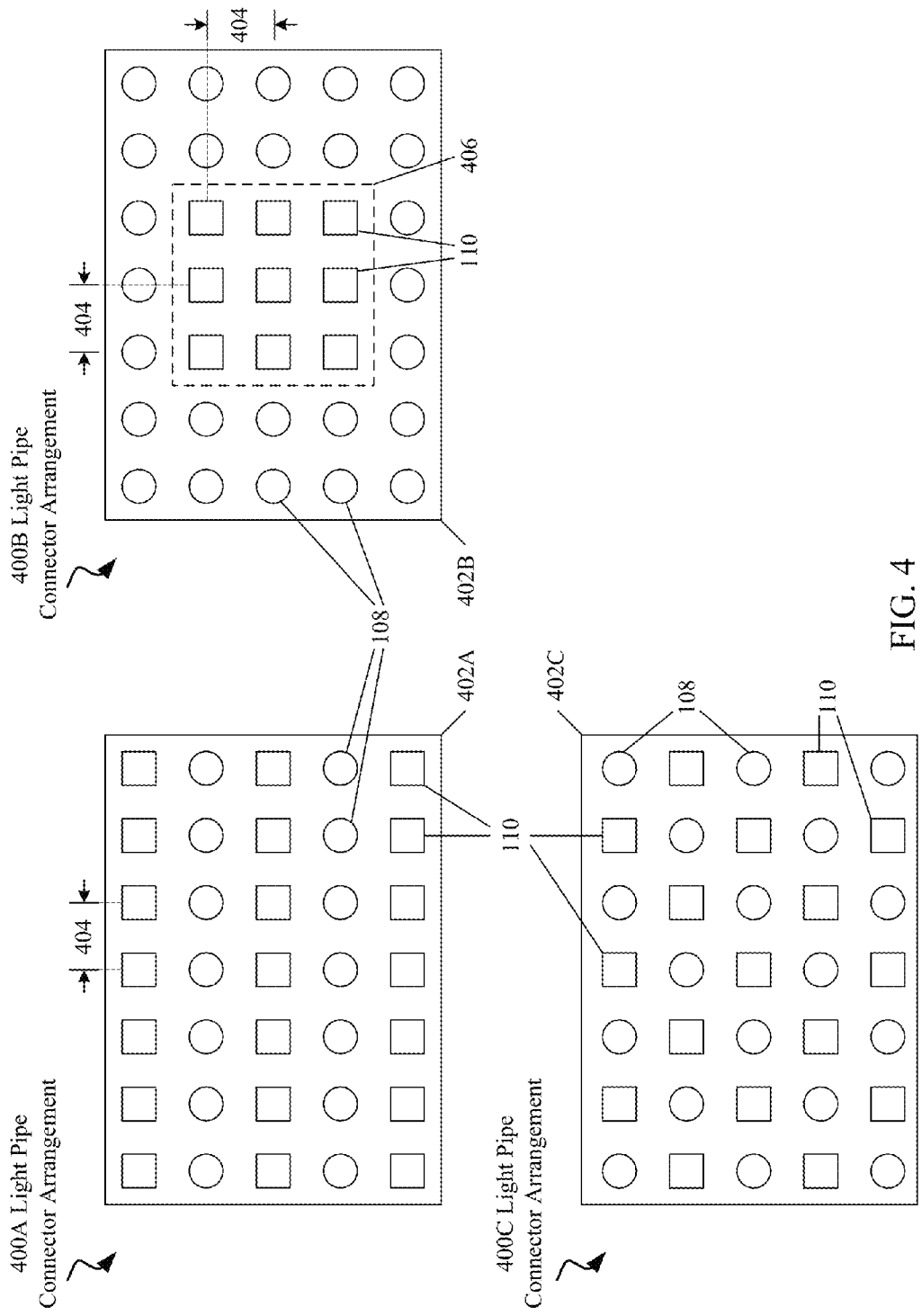
FIG. 4 includes three views of arrangements of light pipe connectors on surfaces of electronic modules, according to embodiments consistent with the figures.

FIG. 4 includes three views 400A, 400B and 400C of arrangements of light pipe connectors 110 and electrical connector structures 108 on surfaces of electronic modules 402A, 402B and 402C, respectively, according to embodiments consistent with the figures. The arrangements depicted in views 400A, 400B and 400C may each provide certain functional benefits, based upon the electrical and optical characteristics of a particular electronic module.

An array of electrical connector structures 108 and light pipe connectors 110 can be useful in providing compact, high-bandwidth optical and electrical interconnections between various optoelectronic components such as a PCB (e.g., 118, FIG. 1), a connector, an optical cable, an electronic module, and other optoelectronic devices. An array of optical and/or electrical connector structures may be useful in providing access, on a face of a PCB, to optical and electrical signal transmission paths which may be formed on internal layers of a PCB.

Some embodiments may use electrical signal paths, for example, attached to electrical connector structures 108, in conjunction with optical signal paths, accessed through light pipe connectors 110, to aggregate data transmission speeds or capabilities. Some embodiments may use multiple optical and/or electrical channels to aggregate bandwidths.

Pre-defined locations of electrical connector structures 108 and light pipe connectors 110 may be used in the fabrication of PCBs having pre-defined, standardized connector footprints and locations. A variety of light pipe connector 110 shapes are possible, including round, square, and other polygonal shapes. Certain relatively simple shapes such as square and round/cylindrical may offer advantages in optical connector, manufacturing and assembly operations.

In some embodiments, arranging electrical and optical connecting structures corresponding to groups of functionally related electrical and optical signals may offer certain advantages over "segregated" optical and electrical interconnects. In certain applications, electrical and optical signal channels may be grouped together to form a particular interface for a bus or other data communication structure. For example, optical signals may be used to transmit high-speed serial data in a particular bus configuration, while electrical signals may be used for related control and feedback functions. Control and feedback functions may include handshaking, data flow control and bit error reporting to an optical transmitter circuit. Arranging functionally related electrical and optical connector structures in a relatively close proximity to each other may provide design and functional advantages in a particular module and/or electronic system. Such arrangements may result in simplified design and implementation of control logic, minimized signal routing and higher performance for the particular bus configuration. Views 400A and 400C depict examples of electrical connector structures 108 and light pipe connectors 110 in relatively close proximity to each other.

In some embodiments, separating electrical and optical connector structures may offer certain design and/or performance advantages. For example, electronic circuits used for electrical interfaces may use different voltage supplies than electronic circuits used for optical interfaces. Segregating electrical and optical connector structures may provide sufficient area on an electronic module, e.g., an IC, to accommodate individual voltage supply distribution structures. View 400B depicts an example of groups of electrical connector structures 108 and light pipe connectors 110 that are generally separated from each other, with light pipe connectors 110 arranged in group 406.

In some embodiments, light pipe connectors 110 can be arranged on a pitch 404 between 250 μm and 1.0 mm, in accordance with pitches and corresponding manufacturing tolerances of BGA connectors and VCSEL light sources. In some embodiments, the size and positioning of optical connectors may be compatible with the size and positioning of corresponding electrical connectors arranged within an array.

Views 400A, 400B and 400C depict three examples of arrangements of light pipe connectors 110 and electrical connector structures 108 on surfaces of electronic modules, according to embodiments. A variety of other optical and electrical connector arrangements may be realized, depending on the electrical, optical, physical and performance needs of an electronic component and/or system, without departing from the scope and spirit of the described embodiments.

Figure 5:
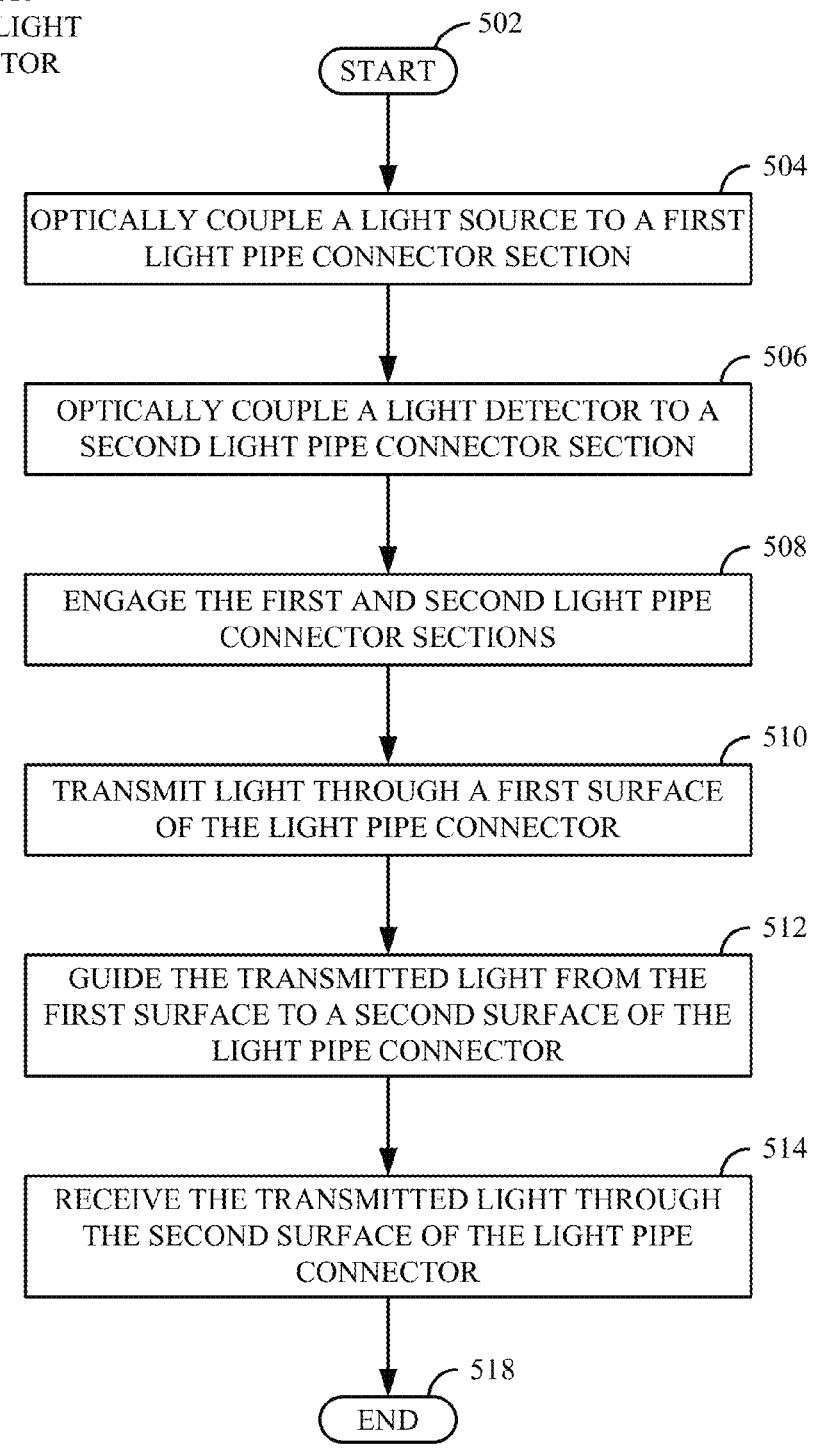
FIG. 5 is a flow diagram illustrating a method for operating a light pipe connector to transmit light between a light source and a light detector, according to embodiments consistent with the figures.

FIG. 5 is a flow diagram illustrating a method of operating a light pipe connector to transmit light between a light source and a light detector, according to embodiments consistent with the figures. The process 500 moves from start 502 to operation 504.

Operation 504 generally refers to optically coupling a light source to a first light pipe connector section. In some embodiments, a light source may be an optoelectronic device such as an LED or a VCSEL. In some embodiments, the light source may be coupled to the first light pipe connector section by placing the connector section adjacent to the light source. In some embodiments, the light source may be coupled through an optically transmissive structure such as a light pipe, to the first light pipe connector section. Once the light source is optically coupled to the light pipe connector section, the process moves to operation 506.

Operation 506 generally refers to optically coupling a light detector to a light pipe connector section. In some embodiments, a light detector may be an optoelectronic device such as photoconductor, junction photodetector, avalanche photodiode or other types of solid-state light detector. In some embodiments, the light detector may be coupled to the second light pipe connector section by placing the connector section adjacent to the light detector. In some embodiments, the light detector may be coupled through an optically transmissive structure such as a light pipe, to the second light pipe connector section. Once the light detector is optically coupled to the light pipe connector section, the process moves to operation 508.

Operation 508 generally refers to engaging the first and second light pipe connector sections. Engaging the first and second light pipe connector sections involves inserting a protrusion of the first connector section into a receptacle of the second connector section. Engagement of the connector sections can be useful for mechanically aligning the sections and providing a continuity of reflective surfaces on the exterior of the mated connector sections. Such continuity of reflective surfaces is useful to direct light received by the first light pipe connector section towards a target or light detector optically coupled to the second light pipe connector section. Once the first and second light pipe connector sections are engaged, the process moves to operation 510.

Operation 510 generally refers to using a light source to transmit light through a first surface of the light pipe connector. In embodiments, the light source may be an LED, a VCSEL, or other type of solid-state laser which can be modulated by digital signals in order to create optical pulses representing digital data. In some embodiments, light may be transmitted through a pair of light pipe connector structures, and in other embodiments, light may be transmitted through three or more interconnected light pipe connector structures. Once light is transmitted through the first surface of the light pipe connector, the process moves to operation 512.

Operation 512 generally refers to guiding transmitted light from the first surface to a second surface of the light pipe connector. According to embodiments, guiding transmitted light through the light pipe connector, from a first surface to a second surface, can involve the use of reflective surfaces of the light pipe connector to guide and focus the light towards a target or light detector. In embodiments, the reflective surfaces are generally in a parallel orientation to the direction of light transmission, and may include a variety of optically reflective materials deposited on or attached to exterior surface(s) of the light pipe connector. Once the light is guided through the light pipe connector, the process moves to operation 514.

Operation 514 generally refers to using a light detector to receive the transmitted light through a second surface of the light pipe connector. According to embodiments, a light detector such as a photodiode may be optically coupled to the second surface of the light pipe connector and used to convert optical pulses representing data into electrical pulses. In some embodiments, the light detector can be placed adjacent to the second surface of the light pipe connector. After the transmitted light is received through the second surface of the light pipe connector, the process 500 may end at block 518.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of operating a light pipe connector to transmit light between a light source and a light detector, the method comprising:
   optically coupling, to the light source, a first optically transmissive connector section the light pipe connector, the first optically transmissive connector section having a first surface and a first optically reflective surface orthogonal to the first surface;
   optically coupling, to the light detector, a second optically transmissive connector section of the light pipe connector;
   inserting a protrusion of the first optically transmissive connector section into a receptacle of the second optically transmissive connector section, the protrusion having a second surface opposite to and in a planar orientation to the first surface, the protrusion further having a second optically reflective surface orthogonal to the second surface, the receptacle having a third surface that, when the protrusion is inserted into the receptacle, is adjacent to and in a planar orientation to the second surface, the second optically transmissive connector section further having a third optically reflective surface in an orthogonal orientation to the third surface, the second optically transmissive connector section further having a fourth surface in a planar orientation to and opposite to the third surface;
   transmitting, using the light source, light through the first surface of the light pipe connector;
   guiding, using the first, the second, and the third optically reflective surfaces, the transmitted light from the first surface to the second surface of the light pipe connector; and
   receiving, using the light detector, through the second surface of the light pipe connector, the transmitted light.

2. The method of claim 1, wherein optically coupling the first optically transmissive connector section to a light source includes locating the first optically transmissive connector section adjacent to the light source.

3. The method of claim 1, wherein optically coupling the second optically transmissive connector section to a light detector includes locating the second optically transmissive connector section adjacent to the light detector.

4. The method of claim 1, wherein the transmitting further comprises using the light source that is integrated with an electronic module.

5. The method of claim 1, wherein the receiving further comprises using the light detector that is integrated with an electronic module.

6. The method of claim 1, wherein the optically coupling further comprises optically coupling the light source to the light detector through an optically transmissive printed circuit board (PCB).

7. The method of claim 1, wherein the optically coupling further comprises optically coupling the light source to the light detector through an optically transmissive cable.

8. The method of claim 1, wherein the transmitting further comprises using a plurality of adjacent light sources arranged on a pitch between 250 μm and 1.0 mm.

9. The method of claim 1, wherein the transmitting further comprises modulating the light source to create a digital signal.

10. The method of claim 1, wherein the transmitting further comprises using a plurality of light sources that are interspersed with electrical connections on a surface of an electronic module.

11. The method of claim 1, wherein the transmitting further comprises using a plurality of light sources, on a surface of an electronic module, that are isolated from a group of electrical connections on the surface of the electronic module.

12. The method of claim 1, wherein the transmitting further comprises transmitting light through a third optically transmissive connector section.

13. The method of claim 1, wherein the transmitting further comprises transmitting light from the second surface of the light pipe connector to the first surface of the light pipe connector.

14. The method of claim 1, wherein engaging a protrusion of the first optically transmissive connector section with a receptacle of the second optically transmissive connector section further comprises engaging the protrusion to a first depth within the receptacle at a first time, and engaging the protrusion to a second depth within the receptacle at a second time.

* * * * *